United States Patent
Kojima et al.

(10) Patent No.: US 9,000,081 B2
(45) Date of Patent: Apr. 7, 2015

(54) ORGANIC-INORGANIC COMPOSITE, MOLDED PRODUCT, AND OPTICAL ELEMENT

(75) Inventors: Takahiro Kojima, Tokyo (JP); Katsumoto Hosokawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/822,251

(22) PCT Filed: Sep. 1, 2011

(86) PCT No.: PCT/JP2011/070422
§ 371 (c)(1),
(2), (4) Date: Mar. 11, 2013

(87) PCT Pub. No.: WO2012/036051
PCT Pub. Date: Mar. 22, 2012

(65) Prior Publication Data
US 2013/0165573 A1    Jun. 27, 2013

(30) Foreign Application Priority Data

Sep. 13, 2010   (JP) ................................ 2010-204366

(51) Int. Cl.
*C08K 3/22*   (2006.01)
*G02B 1/04*   (2006.01)
*C08G 64/06*  (2006.01)
*C08G 64/32*  (2006.01)

(52) U.S. Cl.
CPC  *G02B 1/041* (2013.01); *G02B 1/04* (2013.01); *C08G 64/06* (2013.01); *C08G 64/326* (2013.01); *C08K 3/22* (2013.01)

(58) Field of Classification Search
USPC .......................................... 524/413, 430, 497
See application file for complete search history.

(56) References Cited

FOREIGN PATENT DOCUMENTS

| CN | 102341363 A | 2/2012 |
|----|-------------|--------|
| EP | 1217030 A2 | 6/2002 |
| JP | 04214718 A | 8/1992 |
| JP | 9-316190 A | 12/1997 |
| JP | 3294930 B2 | 6/2002 |
| JP | 2007-291291 A | 11/2007 |
| JP | 4196326 B2 | 12/2008 |
| JP | 2010-209053 A | 9/2010 |
| WO | 2007/043492 A1 | 4/2007 |
| WO | 2010/104199 A2 | 9/2010 |

OTHER PUBLICATIONS

Yusuke Imai et al,"Transparent poly based nanocomposites with high refractive index nanoparticles", European Polymer Journal 45 (2009) 630-638.

Shinichi Kawasaki, et al, "Synthesis and Chemical,Physical,and Optical Properties of 9,9 Diarylfluorene Based Poly", Macromolecules 2007, 40, 5284-5289.

*Primary Examiner* — Peter Szekely
(74) *Attorney, Agent, or Firm* — Canon U.S.A. Inc., IP Division

(57) ABSTRACT

There are provided an organic-inorganic composite having a high refractive index and a low Abbe number in which metal oxide particles of at least one type is added to a polymer containing a repeating unit having the general formula (1) described in Claim 1, and a molded product and an optical element made of the organic-inorganic composite.

In the general formula (1), R1 and R2 independently denote a hydrogen atom or an alkyl group having 1 or more and 6 or less carbon atoms, and Q denotes an oxyethylene group, a thioethylene group, or a single bond.

8 Claims, 1 Drawing Sheet

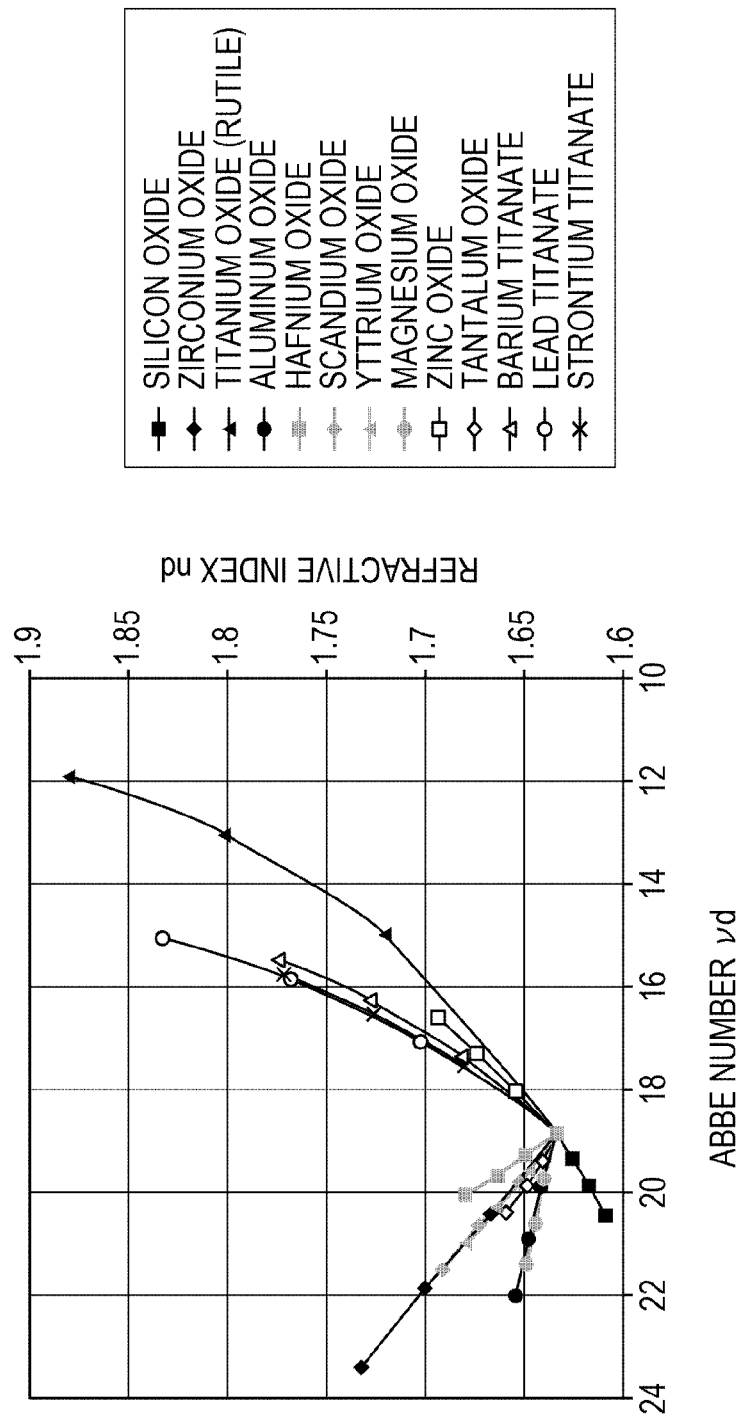

ORGANIC-INORGANIC COMPOSITE, MOLDED PRODUCT, AND OPTICAL ELEMENT

TECHNICAL FIELD

The present invention relates to an organic-inorganic composite that contains a polymer produced by the polymerization of a dihydric alcohol having a naphthalene structure and metal oxide fine particles, a molded product, and an optical element.

BACKGROUND ART

Hitherto, materials having different refractive indexes and Abbe numbers have been combined to correct aberrations in the design of optical systems, such as lenses for cameras, optical disk lenses, fθ lenses, optical elements for image display media, optical films, films, various optical filters, and prisms. In order to increase variations of optical design, there is a demand for materials having various refractive indexes and Abbe numbers. Among them are materials having high refractive indexes and low Abbe numbers.

In particular, resin materials having a fluorene structure are known to have relatively high refractive indexes, low Abbe numbers, and relatively low birefringence and are expected to have high heat resistance. Thus, the syntheses of these resin materials have been studied. PTL 1 discloses a polycarbonate resin having a 9,9'-diphenylfluorene structure and having high heat resistance and mechanical strength.

Resin materials having a naphthalene structure are known to have a higher refractive index than that of resin materials having a fluorene structure. Thus, various resin materials having the naphthalene structure have also been studied. For example, PTL 2 discloses a novel aromatic diamine having a dimethylnaphthalene skeleton and having high mechanical strength, heat resistance, and processibility. The aromatic diamine can be a raw material for aromatic polyamide and polyimide resins.

However, the polycarbonate resin described in PTL 1 is produced by the homopolymerization of a monomer having a 9,9'-diphenylfluorene structure or the copolymerization of this monomer and a second monomer having a lower refractive index than the first monomer. Thus, the polycarbonate resin requires the copolymerization or the addition of a component having a higher refractive index to further increase the refractive index.

Furthermore, it is difficult to produce a polycarbonate resin useful as an optical resin easily and sufficiently for practical applications from the aromatic diamine compound having a dimethylnaphthalene skeleton described in PTL 2. It is necessary to copolymerize a dihydric alcohol having a naphthalene structure to produce a polycarbonate resin having a naphthalene structure.

CITATION LIST

Patent Literature

PTL 1 Japanese Patent No. 4,196,326
PTL 2 Japanese Patent Laid-Open No. 9-316190

SUMMARY OF INVENTION

Technical Problem

The present invention provides an organic-inorganic composite material that contains a polymer produced by the polymerization of a dihydric alcohol having a high refractive index and a low Abbe number and metal oxide fine particles, an molded product of organic-inorganic composite, and an optical element.

In order to solve the problems described above, the present invention provides an organic-inorganic composite that contains a polymer having a repeating unit represented by the general formula (1) and metal oxide particles of at least one type.

[Chem. 1]

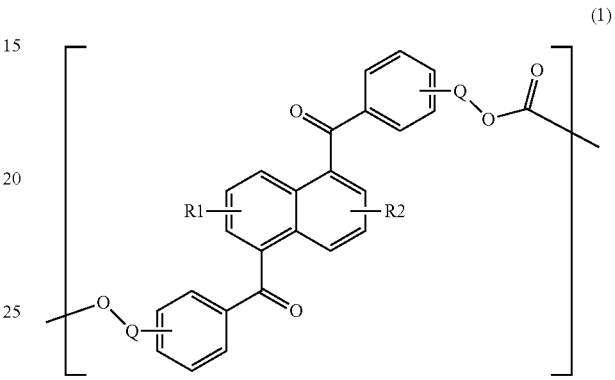

(1)

In the general formula (1), R1 and R2 independently denote a hydrogen atom or an alkyl group having 1 or more and 6 or less carbon atoms, and Q denotes an oxyethylene group, a thioethylene group, or a single bond.

The present invention also provides an organic-inorganic composite in which the repeating unit of the polymer includes at least one repeating unit having the general formula (2) or (3).

[Chem. 2]

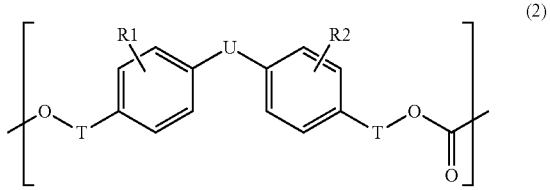

(2)

In the general formula (2), T denotes an oxyalkylene group having 2 or more and 12 or less carbon atoms, a polyoxyethylene group having 2 or more and 12 or less carbon atoms, or a single bond, R3 and R4 independently denote a hydrogen atom, an alkyl group having 1 or more and 6 or less carbon atoms, an alkoxy group having 1 or more and 6 or less carbon atoms, or an aryl group having 6 or more and 12 or less carbon atoms, and may be the same of different, and U denotes an alkylene group having 1 or more and 13 or less carbon atoms, an alkylidene group having 2 or more and 13 or less carbon atoms, a cycloalkylene group having 5 or more and 13 or less carbon atoms, a cycloalkylidene group having 5 or more and 13 or less carbon atoms, an arylene group having 6 or more and 13 or less carbon atoms, fluorenylidene, —O—, —S—, —SO2—, —CO—, or a single bond, and R3, R4, T, and U in one structural unit may be different from R3, R4, T, and U in another structural unit.

The present invention can provide an organic-inorganic composite with which a material having a high refractive index, a low Abbe number, and excellent processibility can be easily manufactured, and a molded product and an optical element made of the organic-inorganic composite.

Further features of the present invention will become apparent from the following description of exemplary embodiments with reference to the attached drawings.

BRIEF DESCRIPTION OF DRAWING

FIG. 1 is a graph showing the optical properties of organic-inorganic composites containing a polymer 1 and various types of metal oxide fine particles.

DESCRIPTION OF EMBODIMENTS

Although the present invention can solve the problems described above with the constitution described above, the present invention can specifically be described by the following embodiments.

Polymer Produced by Polymerization of Dihydric Alcohol

Among the components constituting an organic-inorganic composite according to an embodiment of the present invention, a polymer produced by the polymerization of a dihydric alcohol includes a dihydric alcohol having the general formula (3) as a polymerization component.

[Chem. 3]

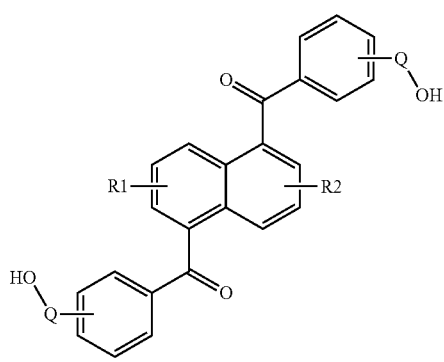

(3)

In the general formula (3), R1 and R2 independently denote a hydrogen atom or an alkyl group having 1 or more and 6 or less carbon atoms, and Q denotes an oxyethylene group, a thioethylene group, or a single bond. In the general formula (3), the sites of substitution of R's are preferably positions 2, 3, 4, 6, 7, and 8 of the naphthalene ring, more preferably positions 2 and 6. In the case that the sites of substitution of R's are positions 2 and 6, the production of a dihydric alcohol having the general formula (3) described below yields a single structural isomer, which advantageously obviates the necessity for isomeric separation.

First, a method for producing a divalent halogeno compound will be described below. This divalent halogeno compound is a precursor of a dihydric alcohol having the general formula (3). A method for producing a divalent halogeno compound is described in Japanese Patent No. 3,294,930. A naphthalene compound having the general formula (4) can be reacted with a benzoyl halide compound having the general formula (5) in the presence of a Lewis acid catalyst to produce a divalent halogeno compound having the general formula (6).

[Chem. 4]

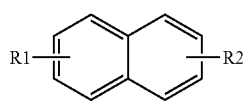

(4)

In the general formula (4), R's each independently denote a hydrogen atom or an alkyl group having 1 to 6 carbon atoms.

[Chem. 5]

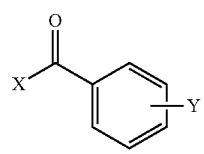

(5)

In the general formula (5), X and Y each independently denote a fluorine, chlorine, bromine, or iodine atom.

[Chem. 6]

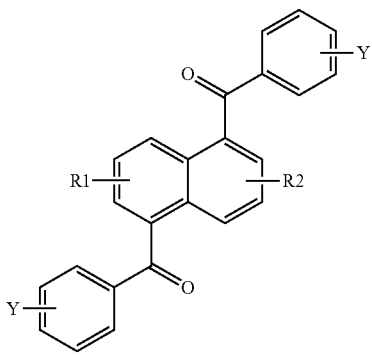

(6)

In the general formula (6), Y denotes a fluorine, chlorine, or bromine atom.

The reaction of a naphthalene compound having the general formula (4) with a benzoyl halide compound having the general formula (5) is a Friedel-Crafts acylation. The Lewis acid catalyst may be a strong Lewis acid, such as aluminum chloride, iron(III) chloride, or boron fluoride.

In this case, the stoichiometric ratio of a naphthalene compound having the general formula (4) to a benzoyl halide compound having the general formula (5) (the number of moles of a naphthalene compound having the general formula (4))/(the number of moles of a benzoyl halide compound having the general formula (5)) is preferably 2 or more and 10 or less, more preferably 2 or more and 6 or less. A stoichiometric ratio of less than 2 may result in a low yield of a divalent halogeno compound having the general formula (6) because of the production of a by-product. A stoichiometric ratio of more than 10 may result in an increase in the amount of benzoyl halide compound having the general formula (5) used, which increases the production cost. The amount of Lewis acid used is generally, but not limited to, two equivalents or more and four equivalents or less with respect to the amount of naphthalene compound having the general formula (4).

An organic solvent may be used in the reaction, including chlorinated hydrocarbons, such as nitromethane, nitrobenzene, chlorobenzene, bromobenzene, dichloromethane (methylene chloride), chloroform, dichloroethane, trichloroethane, tetrachloroethane, pentachloroethane, and chlorobenzene. The reaction conditions are not particularly limited. In general, the reaction temperature ranges from 10° C. to 50° C., and the reaction time ranges from 12 to 48 hours. A desired divalent halogeno compound having the general formula (6) may be easily purified by recrystallization or chromatography, more suitably by recrystallization.

A divalent halogeno compound having the general formula (6) can then be converted into a dihydric alcohol having the general formula (3) using various reagents depending on the structure of Q in the general formula (3). For example, a compound in which Q is a single bond can be directly synthesized using a base, such as potassium hydroxide. This compound may also be synthesized by acetoxylation with cesium acetate and subsequent hydrolysis with a base. In this case, the reaction temperature may range from 150° C. to 200° C., and therefore a high-boiling polar solvent, such as N,N-dimethylformamide or dimethyl sulfoxide, may be used. The reaction time ranges from approximately 12 to 48 hours.

A compound in which Q in the general formula (3) is an oxyethylene group or a thioethylene group may be synthesized by two methods. In one method, a divalent halogeno compound having the general formula (6) is reacted with ethylene glycol or 2-mercaptoethanol in the presence of a strong base, such as potassium hydroxide or potassium tert-butoxide. In the other method, a compound in which the structure of Q in the general formula (3) is a single bond is reacted with 2-chloroethanol in an organic solvent, such as N,N-dimethylformamide or dimethyl sulfoxide, in the presence of cesium carbonate.

The stoichiometric ratio of an alcohol or thiol to be reacted with a divalent halogeno compound having the general formula (6), that is, (the number of moles of alcohol or thiol)/(the number of moles of a divalent halogeno compound having the general formula (6)), is preferably 2 or more and 100 or less and, when the alcohol or thiol is nucleophilic 2-mercaptoethanol in the presence of a strong base, more preferably two. A stoichiometric ratio of less than 2 may result in a low yield of a dihydric alcohol having the general formula (3) because of the production of a by-product. A stoichiometric ratio of more than 100 may result in an increase in the amount of alcohol or thiol used, which increases the production cost.

In the case that a dihydric alcohol having the general formula (3) is reacted with 2-chloroethanol, the stoichiometric ratio of (the number of moles of 2-chloroethanol)/(the number of moles of a dihydric alcohol having the general formula (3)) may range from 2 to 100. A stoichiometric ratio of less than 2 may result in a low yield of the dihydric alcohol having the general formula (3) because of the production of a by-product. A stoichiometric ratio of more than 100 may result in an increase in the amount of 2-chloroethanol used, which increases the production cost.

Although the reaction temperature and time depend on the type and the stoichiometric amount of alcohol or thiol to be reacted, the reaction temperature and time are generally 150° C. or less and 12 to 48 hours so as to reduce the production of by-products. The resulting product may be easily purified by recrystallization or chromatography, more suitably by recrystallization.

In a dihydric alcohol having the general formula (3), a plurality of aromatic rings in its molecule are linked through a carbonyl group. In general, a polymeric material having an increased refractive index tends to have relatively poor processibility. In other words, a polymeric material having an increased refractive index tends to have a relatively high processing temperature during melt forming, which may cause an increase in molding cost or yellowing of the polymeric material. However, in a polymer having a repeating unit represented by the general formula (1), it is assumed that the repeating unit is effective in increasing the flexibility of the polymer main chain. Thus, while having a relatively high refractive index, the polymer is expected to have excellent processibility.

Among the components constituting an organic-inorganic composite according to an embodiment of the present invention, the polymer produced by the polymerization of a dihydric alcohol is synthesized using a dihydric alcohol having the general formula (3) as a polymerization component and includes a repeating unit having the general formula (1).

[Chem. 7]

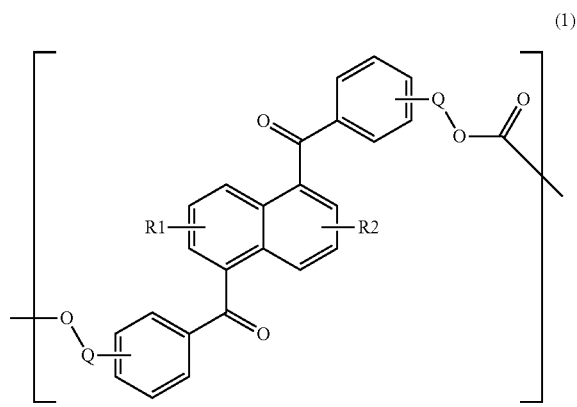

(1)

In the general formula (1), R1 and R2 independently denote a hydrogen atom or an alkyl group having 1 or more and 6 or less carbon atoms, and Q denotes an oxyethylene group, a thioethylene group, or a single bond.

The molar percentage of a repeating unit having the general formula (1) is preferably 10 percent or more, more preferably 25 percent or more. The phrase "the molar percentage of a repeating unit", as used herein, refers to the number of repeating units having the general formula (1) divided by the total number of repeating units in the polymer in terms of percentage. With a higher molar percentage of a repeating unit having the general formula (1), the high refractive index of a dihydric alcohol having the general formula (3) is more strongly reflected in the polymer.

Other copolymerization components in the polymer may be any components having desired characteristics and can suitably include a copolymerization component having the general formula (7).

[Chem. 8]

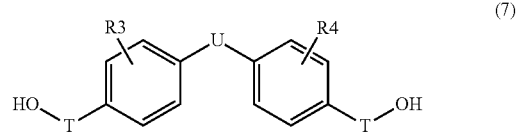

(7)

In the general formula (7), T denotes an oxyalkylene group having 2 or more and 12 or less carbon atoms, a polyoxyethylene group having 2 or more and 12 or less carbon atoms, or a single bond, R3 and R4 independently denote a hydrogen atom, an alkyl group having 1 or more and 6 or less carbon atoms, an alkoxy group having 1 or more and 6 or less carbon atoms, or an aryl group having 6 or more and 12 or less carbon atoms, and may be the same of different, and U denotes an alkylene group having 1 or more and 13 or less carbon atoms, an alkylidene group having 2 or more and 13 or less carbon atoms, a cycloalkylene group having 5 or more and 13 or less carbon atoms, a cycloalkylidene group having 5 or more and 13 or less carbon atoms, an arylene group having 6 or more and 13 or less carbon atoms, fluorenylidene, —O—, —S—, —SO2—, —CO—, or a single bond, and R3, R4, T, and U in one structural unit may be different from R3, R4, T, and U in another structural unit.

In the case that a dihydric alcohol having the general formula (7) is a copolymerization component, the resulting polymer contains a repeating unit having the general formula (2).

[Chem. 9]

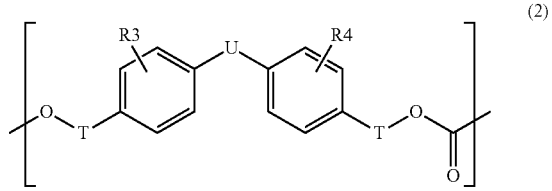

(2)

In the general formula (2), T denotes an oxyalkylene group having 2 or more and 12 or less carbon atoms, a polyoxyethylene group having 2 or more and 12 or less carbon atoms, or a single bond, R3 and R4 independently denote a hydrogen atom, an alkyl group having 1 or more and 6 or less carbon atoms, an alkoxy group having 1 or more and 6 or less carbon atoms, or an aryl group having 6 or more and 12 or less carbon atoms, and may be the same of different, and U denotes an alkylene group having 1 or more and 13 or less carbon atoms, an alkylidene group having 2 or more and 13 or less carbon atoms, a cycloalkylene group having 5 or more and 13 or less carbon atoms, a cycloalkylidene group having 5 or more and 13 or less carbon atoms, an arylene group having 6 or more and 13 or less carbon atoms, fluorenylidene, —O—, —S—, —SO2—, —CO—, or a single bond, and R3, R4, T, and U in one structural unit may be different from R3, R4, T, and U in another structural unit. In this case, depending on the copolymerization ratio, the thermal stability and optical properties of the dihydric alcohol having the general formula (7) are reflected in the polymer.

A multimer of a dihydric alcohol having the general formula (7) may be used as a copolymerization component. For example, oxyalkylene groups or polyoxyethylene groups of each T of the general formula (7) in a plurality of molecules may be linked through —O—, —S—, —SO2—, —CO—, or a single bond. These copolymerization components may be used alone or in combination.

In the case that a polymer produced by the polymerization of a dihydric alcohol among the components constituting an organic-inorganic composite according to an embodiment of the present invention contains a repeating unit other than the repeating units having the general formula (1) or (2), the molar percentage of the repeating unit other than the repeating units having the general formula (1) or (2) may be 10 percent or less. The phrase "the molar percentage of a repeating unit other than the repeating units having the general formula (1) or (2)", as used herein, refers to the number of repeating units other than the repeating units having the general formula (1) or (2) divided by the total number of repeating units in the polymer in terms of percentage. A molar percentage of a repeating unit other than the repeating units having the general formula (1) or (2) of more than 10 percent may result in unsatisfactory physical properties, such as poor thermal stability, a low refractive index, and high birefringency.

Among the components constituting an organic-inorganic composite according to an embodiment of the present invention, a polymer produced by the polymerization of a dihydric alcohol can be produced by various methods, including three methods described below. These methods can be performed independently or stepwise.

A first method involves interfacial polycondensation between dihydric alcohols having the general formulae (3) and (7) and phosgene or a phosgene derivative in a mixed solution of an organic solvent and a basic aqueous solution.

In accordance with the first method, phosgene or the phosgene derivative is reacted in a liquid mixture of a basic aqueous solution of an alkali metal compound, the dihydric alcohols having the general formulae (3) and (7), and an inert organic solvent to yield a desired polycarbonate. Examples of the inert organic solvent include, but are not limited to, chlorinated hydrocarbons, such as dichloromethane(methylene chloride), dichloroethane, trichloroethane, tetrachloroethane, and chlorobenzene, and acetophenone. Although the reaction conditions are not particularly limited, in general, after initial cooling to a temperature in the range of 0° C. to normal temperature, the reaction may be performed at a temperature in the range of 0° C. to 70° C. for 30 minutes to 6 hours.

The ratio of phosgene or the phosgene derivative to dihydric alcohols having the general formulae (3) and (7), that is, (the number of moles of phosgene or the phosgene derivative)/(the total number of moles of dihydric alcohols having the general formulae (3) and (7)), may be 0.3 or more and 1.5 or less. At a ratio of less than 0.3, part of the dihydric alcohols may remain unreacted, resulting in a low yield. A ratio of more than 1.5 may result in an increase in the amount of phosgene or phosgene derivative used, making separation and purification after the reaction difficult.

In order to promote the reaction, a phase-transfer catalyst may be added to the organic solvent. Examples of the phase-transfer catalyst include, but are not limited to, organic bases, such as triethylamine, tetramethylethylenediamine, and pyridine.

In order to control the degree of polymerization, a terminating agent may be added to the reaction solution. Examples of the terminating agent include, but are not limited to, those commonly used in the polymerization of polycarbonates, including monovalent phenols, such as phenol, p-cresol, p-tert-butylphenol, p-tert-octylphenol, bromophenol, and tribromophenol. Examples of the phosgene derivative include, but are not limited to, bis(trichloromethyl)carbonate, bromophosgene, bis(2,4,6-trichlorophenyl)carbonate, bis(2,4-dichlorophenyl)carbonate, bis(cyanophenyl)carbonate, and trichloromethyl chloroformate.

A second method for producing a polymer by the polymerization of a dihydric alcohol among the components constituting an organic-inorganic composite according to an embodiment of the present invention involves transesterification between dihydric alcohols having the general formulae (3) and (7) and a carbonic acid diester. Examples of the carbonic acid diester include, but are not limited to, diphenyl carbonate, ditolyl carbonate, bis(chlorophenyl)carbonate, bis(nitrophenyl)carbonate, dinaphthyl carbonate, bisphenol A bisphenyl carbonate, dimethyl carbonate, diethyl carbonate, dibutyl carbonate, dicyclohexyl carbonate, ethylphenyl carbonate, butylphenyl carbonate, cyclohexylphenyl carbonate, and bisphenol A methylphenyl carbonate. In the transesterification, the dihydric alcohols having the general formulae (3) and (7) may be in the form of carbonic acid diester derivatives.

The molar ratio of the carbonic acid diester to the dihydric alcohols may be 1.0 or more and 2.5 or less. At a molar ratio of less than 1.0, part of the dihydric alcohols may remain unreacted, resulting in a low yield. A molar ratio of more than 2.5 may result in an increase in the amount of carbonic acid diester used, making separation and purification after the reaction difficult. Also in the transesterification, if necessary, a terminating agent may be added as in the first method.

In the transesterification, the reaction temperature is generally preferably 350° C. or less, more preferably 300° C. or less. It is desirable to gradually increase the reaction temperature as the reaction proceeds. The transesterification at a temperature of more than 350° C. may unfavorably result in the thermal decomposition of the polymer. The reaction pressure may be appropriately controlled in accordance with the vapor pressure of monomers to be used and the boiling point of the product so as to efficiently perform the reaction. When products other than the polymer produced from the ester compounds used, that is, by-products of the transesterification can be removed under reduced pressure, the reaction pressure may be decreased to remove the by-products as the reaction proceeds so as to increase the reaction rate and yield. The reaction may be performed until the target molecular weight is achieved, generally for approximately 10 minutes to 12 hours.

The transesterification may be performed batch-wise or continuously. A reactor to be used may be of any material and structure provided that the reactor has heating and stirring functions. The reactor may be of an extruder type as well as a tank type.

The transesterification is generally performed in the absence of solvent. When the dihydric alcohols have too high melting points to be reacted, 1 to 200 percent by weight of an inert organic solvent with respect to the resulting polymer may be added. Examples of the inert organic solvent include, but are not limited to, aromatic compounds, such as diphenyl ether, halogenated diphenyl ether, benzophenone, diphenyl sulfone, polyphenyl ether, dichlorobenzene, and methylnaphthalene, cycloalkanes, such as tricyclo(5.2.10)decane, cyclooctane, and cyclodecane, and chlorinated hydrocarbons, such as dichloromethane(methylene chloride), chloroform, dichloroethane, trichloroethane, tetrachloroethane, pentachloroethane, and chlorobenzene. If necessary, the transesterification may be performed in an inert gas atmosphere. Examples of the inert gas include, but are not limited to, helium, argon, carbon dioxide, and nitrogen.

If necessary, a catalyst commonly used in transesterification may be used. Examples of the common transesterification catalyst include, but are not limited to, alkali metal compounds, such as lithium hydroxide, sodium hydroxide, and potassium hydroxide, alkaline-earth metal compounds, nitrogen-containing basic compounds, such as amines and quaternary ammonium salts, and boron compounds. Among these, the nitrogen-containing basic compounds have high catalytic activities and can be easily removed from the reaction system. Examples of the nitrogen-containing basic compounds include, but are not limited to, trihexylamine, tetramethylammonium hydroxide, tetrabutylammonium hydroxide, and dimethylaminopyridine.

The amount of the catalyst described above ranges from $1\times10^{-2}$ to $1\times10^{-8}$ mol, preferably $1\times10^{-3}$ to $1\times10^{-7}$ mol, per mole of the dihydric alcohols. An amount of the catalyst of less than $1\times10^{-8}$ mol may result in insufficient catalytic effects. An amount of the catalyst of more than $1\times10^{-2}$ mol may result in poor physical properties of the resulting polymer, such as low heat resistance and hydrolysis resistance.

A third method for producing a polymer by the polymerization of a dihydric alcohol among the components constituting an organic-inorganic composite according to an embodiment of the present invention involves the ester polymerization of dihydric alcohols having the general formulae (3) and (7) and a dicarboxylic acid derivative. Examples of the dicarboxylic acid derivative include, but are not limited to, aliphatic carboxylic acids, such as succinic acid, glutaric acid, adipic acid, pimelic acid, suberic acid, and cyclohexanedicarboxylic acid, aromatic carboxylic acids, such as phthalic acid, isophthalic acid, terephthalic acid, and naphthalenedicarboxylic acid, oxychlorides of these dicarboxylic acids, methyl esters of these dicarboxylic acids, ethyl esters of these dicarboxylic acids, and dicarboxylic anhydrides, such as phthalic acid anhydride and naphthalenedicarboxylic acid.

The molar ratio of the dicarboxylic acid derivative to the dihydric alcohols may be 0.7 or more and 1.5 or less. At a ratio of less than 0.7, a large part of dihydric alcohols may remain unreacted, resulting in a low yield. At a ratio of more than 1.5, a large part of the dicarboxylic acid derivative may remain unreacted, resulting in a low yield.

In the ester polymeriation, the reaction temperature is generally preferably 350° C. or less, more preferably 300° C. or less. It is desirable to gradually increase the reaction temperature as the reaction proceeds. When products other than the polymer produced from the dicarboxylic acid derivative used, that is, by-products of the ester polymerization can be removed under reduced pressure, the reaction pressure may be decreased to remove the by-products as the reaction proceeds so as to increase the reaction rate and yield. The reaction may be performed until the target molecular weight is achieved, generally for approximately 10 minutes to 12 hours.

The ester polymerization may be performed batch-wise or continuously. A reactor to be used may be of any material and structure provided that the reactor has heating and stirring functions. The reactor may be of an extruder type as well as a tank type.

The ester polymerization reaction may be performed in the presence of 1 to 200 percent by weight of an inert organic solvent with respect to the resulting polymer. Examples of the inert organic solvent include, but are not limited to, aromatic compounds, such as diphenyl ether, halogenated diphenyl ether, benzophenone, diphenyl sulfone, polyphenyl ether, dichlorobenzene, and methylnaphthalene, cycloalkanes, such as tricyclo(5.2.10)decane, cyclooctane, and cyclodecane, and chlorinated hydrocarbons, such as dichloromethane(methylene chloride), chloroform, dichloroethane, trichloroethane, tetrachloroethane, pentachloroethane, and chlorobenzene. If necessary, the ester polymerization may be performed in an inert gas atmosphere. Examples of the inert gas include, but are not limited to, helium, argon, carbon dioxide, and nitrogen.

The polymer produced by any one of the methods described above can be purified by a known method, for example, reprecipitation with a poor solvent, such as methanol or water. The polymer after reprecipitation may be heat-dried under reduced pressure to remove residual solvent, yielding a polymer produced by the polymerization of a dihydric alcohol among the components constituting an organic-inorganic composite according to an embodiment of the present invention. The drying temperature may generally range from 100° C. to 350° C. The residual solvent cannot be sufficiently removed at a temperature of less than 100° C. A temperature of more than 350° C. may result in the thermal decomposition of the polymer, resulting in unsatisfactory physical properties.

Metal Oxide Particles

Among the components constituting the organic-inorganic composite, the metal oxide fine particles will be described below. Examples of the metal oxide fine particles for use in the present invention include, but are not limited to, fine particles of silicon oxide, titanium oxide, aluminum oxide, zirconium oxide, hafnium oxide, yttrium oxide, indium oxide, niobium oxide, magnesium oxide, zinc oxide, cerium oxide, and tantalum oxide, and complex oxides thereof, such as zirconium silicate, phosphates, such as zirconium phosphate, and titanates, such as barium titanate. Among these, examples of fine particles having high refractive indexes include, but are not limited to, fine particles of titanium oxide, aluminum oxide, zirconium oxide, hafnium oxide, yttrium oxide, magnesium oxide, zinc oxide, and tantalum oxide, and complex oxides thereof, and titanates, such as barium titanate. Furthermore, a plurality of metal oxides may be used in combination.

Metal oxide fine particles for use in the present invention may be dispersed in an organic solvent at a concentration of 1 percent by weight or more without producing precipitation. The organic solvent may be an alcohol, such as ethanol or isopropyl ether, a ketone, such as acetone or methyl isobutyl ketone, an ether, such as diethyl ether or tetrahydrofuran, an ester, such as ethyl acetate, a halogen-containing hydrocarbon, such as chloroform, an aliphatic hydrocarbon, such as normal hexane, or an aromatic hydrocarbon, such as toluene, xylene, or tetralin, or a combination thereof.

Metal oxide fine particles for use in the present invention may be chemically-treated metal oxide fine particles the surface of which is linked to an organic group through a covalent bond or an electrostatic interaction, or untreated metal oxide particles alone. The phrase "chemically-treated", as used herein, means that the metal oxide fine particles are reacted with a surface-treating agent, for example, a silane coupling agent, such as an alkylsilazane or an alkoxysilane, an organometallic coupling agent of titanium or zirconium, a siloxane compound, such as a modified silicone, or a surfactant, such as a fatty acid salt or phosphate.

The surface-treating agent used in the surface treatment may have any structure depending on the dispersibility of a polymer produced by the polymerization of a dihydric alcohol among the components constituting an organic-inorganic composite according to an embodiment of the present invention in an organic solvent. A plurality of surface-treating agents may be used in combination.

Examples of the silane coupling agent include, but are not limited to, hexamethyldisilazane, hexadecylsilazane, methyltrimethoxysilane, dimethyldimethoxysilane, trimethylmethoxysilane, propyltrimethoxysilane, hexyltrimethoxysilane, octyltrimethoxysilane, vinyltrimethoxysilane, phenyltrimethoxysilane, diphenyldimethoxysilane, styryltrimethoxysilane, aminopropyltrimethoxysilane, acryloxypropyltrimethoxysilane, methacryloxypropyltrimethoxysilane, and mercaptopropyltrimethoxysilane.

Examples of the organometallic coupling agent of titanium or zirconium include, but are not limited to, isopropyl triisostearoyl titanate, isopropyl dimethacryl isostearoyl titanate, isopropyl tridodecylbenzenesulfonyl titanate, zirconium tributoxymonoacetylacetonate, and zirconium dibutoxybis (ethylacetoacetate).

Examples of the modified silicone include, but are not limited to, methoxy-modified silicone, carboxy-modified silicone, carboxy-modified silicone, polyether-modified silicone, epoxy-modified silicone, mercapto-modified silicone, amino-modified silicone, and methacrylate-modified silicone.

Examples of the surfactant include, but are not limited to, anionic surfactants, cationic surfactants, amphoteric surfactants, and nonionic surfactants. Examples of the anionic surfactants include, but are not limited to, fatty acid sodium salts, such as sodium oleate, fatty acid potassium salts, sodium alkyl phosphates, sodium alkyl sulfates, and sodium alkylbenzenesulfonates. Examples of the cationic surfactants include, but are not limited to, alkylmethylammonium chlorides, alkyldimethylammonium chlorides, alkyltrimethylammonium chlorides, and alkyldimethylbenzylammonium chlorides. Examples of the amphoteric surfactants include, but are not limited to, alkylamino carboxylates and phosphates. Examples of the nonionic surfactants include, but are not limited to, polyoxyethylene lanolin fatty acid esters, polyoxyethylene alkylphenyl ethers, and fatty acid alkanolamides.

Metal oxide fine particles for use in the present invention may have an average primary particle size of 1 nm or more and 50 nm or less. The term "average primary particle size", as used herein, refers to the diameter of a sphere having the same volume as the particle. Particles having a primary particle size of less than 1 nm tend to agglomerate over time and may have unstable properties. Particles having a primary particle size of more than 50 nm are difficult to disperse in a mixture and may be precipitated.

Organic-Inorganic Composite

A method for manufacturing an organic-inorganic composite according to the present invention will be described below. An organic-inorganic composite according to an embodiment of the present invention can be manufactured by uniformly dispersing metal oxide fine particles in a polymer produced by the polymerization of the dihydric alcohol described above. In order to facilitate the uniform dispersion, it is also effective to mix the polymer (or a solution thereof) and the metal oxide fine particles (or a dispersion liquid thereof) in an organic solvent and then remove the solvent component(s) in the mixture. Alternatively, after the polymer is dissolved in an organic solvent, an inorganic compound precursor of the metal oxide fine particles instead of the metal oxide fine particles is added to the organic solvent to chemically (in-situ) synthesize fine particles in the solvent. Volatile components in the mixture may then be removed.

The organic solvent may be any organic solvent that can dissolve the polymer. The organic solvent may be an alcohol, such as ethanol or isopropyl ether, a ketone, such as acetone or methyl isobutyl ketone, an ether, such as diethyl ether or tetrahydrofuran, an ester, such as ethyl acetate, a halogen-containing hydrocarbon, such as chloroform, an aliphatic hydrocarbon, such as normal hexane, or an aromatic hydrocarbon, such as toluene, xylene, or tetralin, or a combination thereof.

In the case that the metal oxide fine particles are added to a polymer produced by the polymerization of the dihydric alcohol described above in the absence of an organic solvent, the polymer is melted at a temperature higher than the glass transition point of the polymer so as to enhance the uniformity of the mixture. Mixing in such a case may be performed with a roll mill, a kneader mill, a mixer, a single-screw extruder, or an extruder having two or more screws.

A method for dissolving a polymer in an organic solvent is not particularly limited. In general, an organic solvent and a polymer are stirred in a mixer (a container equipped with a stirrer, such as a magnetic stirrer, or a mixing tank equipped with impeller blades). In order to promote the dissolution of the polymer, the organic solvent may be heated to a temperature below the boiling point of the organic solvent. Furthermore, the particle size of the polymer introduced into the mixer can be reduced to less than 100 μm to increase the contact area between the polymer and the solvent, thereby promoting the dissolution of the polymer in the solvent. The term "particle size", as used herein, refers to the diameter of a sphere having the same volume as the particle.

In order to dissociate the agglomeration of metal oxide fine particles in an organic solvent and increase the uniformity of the mixture, a metal oxide dispersion liquid or a solution containing a polymer and the metal oxide fine particles may be subjected to dispersion treatment before the addition thereof. Metal oxide fine particles may be dispersed by any method, for example, a method using a mixer, a high pressure homogenizer, a wet media mill (bead mill, ball mill, or disk mill), or an ultrasonic homogenizer.

Mixing in an organic solvent requires a subsequent process for removing the solvent component(s) from the resulting mixture. Organic solvents having a low boiling point can be removed by heating. In order to sufficiently remove the solvent component(s) such that an organic-inorganic composite has desired physical properties, a high temperature of 150° C. or more is required under atmospheric pressure. Heating under reduced pressure can decrease the temperature required for solvent removal and reduce oxidative degradation caused by contact with oxygen in the air.

In the case that an inorganic compound precursor of metal oxide fine particles instead of the metal oxide fine particles is added to a polymer solution to chemically (in-situ) synthesize fine particles in the solvent, the precursor of metal oxide fine particles may be a metal alkoxide, such as titanium tetraisopropoxide, titanium tetrabutoxide, zirconium tetraisopropoxide, or zirconium tetrabutoxide, a metal hydroxide, or an oxychloride, such as zirconium oxychloride.

In the case of a metal alkoxide precursor, the metal oxide fine particles can be synthesized by the hydrolysis of the metal alkoxide precursor with water in the solvent. The hydrolysis can be promoted by an acid catalyst, such as hydrochloric acid or acetic acid, or a base catalyst, such as ammonia or an amine. Thus, the concentration and the particle size of the metal oxide fine particles can be controlled by the amount of catalyst. In the case of a metal hydroxide or oxychloride precursor, dehydration or dehydrochlorination can be promoted by heating or pH control to yield the metal oxide fine particles.

The difference in optical properties between an organic-inorganic composite according to an embodiment of the present invention and a polymer produced by the polymerization of a dihydric alcohol among the components constituting the organic-inorganic composite increases with an increase in the ratio of the metal oxide fine particles to the polymer. Particularly in the case of the metal oxide fine particles made of titanium oxide, aluminum oxide, zirconium oxide, hafnium oxide, yttrium oxide, magnesium oxide, zinc oxide, or tantalum oxide, or a complex oxide thereof, the addition of the metal oxide fine particles increases the refractive index. Thus, the addition of a smaller number of metal oxide fine particles has a smaller effect of improving the optical properties. However, an excessively high volume fraction of the fine particles results in low flowability during melt forming, resulting in poor moldability. Thus, in order to satisfy both a high refractive index and high molding stability, the concentration of the metal oxide fine particles in the organic-inorganic composite may be 1 percent by volume or more and 15 percent by volume or less.

Processing

An organic-inorganic composite according to an embodiment of the present invention may contain an additive agent without compromising the advantages of the present invention. Examples of the additive agent include, but are not limited to, phosphorus processing heat stabilizers, hydroxylamine processing heat stabilizers, antioxidants, such as hindered phenols, light stabilizers, such as hindered amines, ultraviolet absorbers, such as benzotriazoles, triazines, benzophenones, and benzoates, plasticizers, such as phosphates, phthalates, citrates, and polyesters, mold-release agents, such as silicones, flame retardants, such as phosphates and melamines, antistatic agents, such as fatty acid ester surfactants, organic dye colorants, and impact modifiers. These additive agents may be used alone or in combination.

The additive agent(s) may be added to an organic-inorganic composite according to an embodiment of the present invention by any known method, for example, a method using a screw extruder, a roll mill, a kneader mill, a mixer, a high pressure homogenizer, a wet medium pulverizer (bead mill, ball mill, or disk mill), or an ultrasonic homogenizer. The resulting organic-inorganic composite can be used in the manufacture of various molded products and optical elements by a known molding method, for example, injection molding, blow molding, extrusion molding, press molding, or calendering.

In the manufacture of optical elements from an organic-inorganic composite according to an embodiment of the present invention by injection molding, the organic-inorganic composite may be pelletized in advance. The pellets are fed into an injection molding machine having a mixing zone equipped with a melting cylinder and a screw. After heating and melt-kneading, the organic-inorganic composite can be injected into a molding die. An optical element having any shape can be manufactured through a molding die having a mirror-finished plane, depressed, or raised surface of any shape.

In the manufacture of optical elements from an organic-inorganic composite according to an embodiment of the present invention by press molding, the organic-inorganic composite may be pulverized with a pulverizer, such as a mortar, a stamp mill, or a ball mill, in advance. The resulting powder is melted in a molding die having a mirror-finished plane, depressed, or raised surface of any shape at a temperature higher than the glass transition point of the polymer and is pressed into an optical element having any shape.

EXAMPLES

The examples of the present invention will be described below. However, the present invention is not limited to these examples.

The synthesis examples of a dihydric alcohol and a polymer for use in the present invention will be described below.

Synthesis of Dihydric Alcohol (4a)

[Chem. 10]

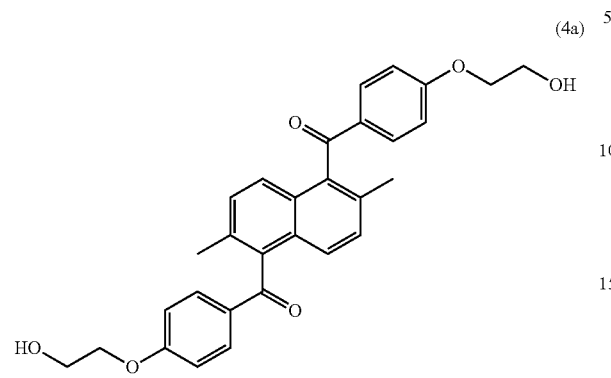

(4a)

A divalent halogeno compound 6a was synthesized in accordance with Japanese Patent No. 3,294,930.

[Chem. 11]

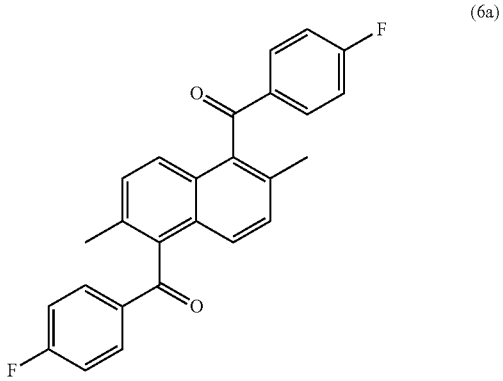

(6a)

2,6-dimethylnaphthalene (30.0 g, 192 mmol), nitromethane (600 mL), and 4-fluorobenzoic acid chloride (76.0 g, 481 mmol) in a 1-L recovery flask was cooled to 0° C. Pulverized anhydrous aluminum chloride (63.9 g, 481 mmol) was slowly added while stirring. After stirred at room temperature for one hour, the reaction solution was allowed to react at 80° C. for three hours. After cooled to room temperature, the reaction mixture was poured into a cooled 1.5 M aqueous hydrochloric acid to stop the reaction. An oil layer was extracted and was dried over anhydrous magnesium sulfate. The solvent of the oil layer was removed with an evaporator. The resulting solid was recrystallized in a mixed solvent of methanol and acetone to yield a divalent halogeno compound 6a (48.4 g, yield 63%).

The divalent halogeno compound 6a (18.0 g, 45.0 mmol), dimethyl sulfoxide (100 mL), and potassium hydroxide (15.1 g, 270 mmol) were allowed to react in a 1-L recovery flask at 180° C. for 20.5 hours. The reaction mixture was poured into a cooled 3M aqueous hydrochloric acid (400 mL) to allow a product to be precipitated out of the solution. After the precipitate was washed with water and chloroform, air was blown for two hours to remove a malodor. The subsequent vacuum drying yielded a dihydric alcohol 4b (17.8 g, quantitative yield (100%)).

[Chem. 12]

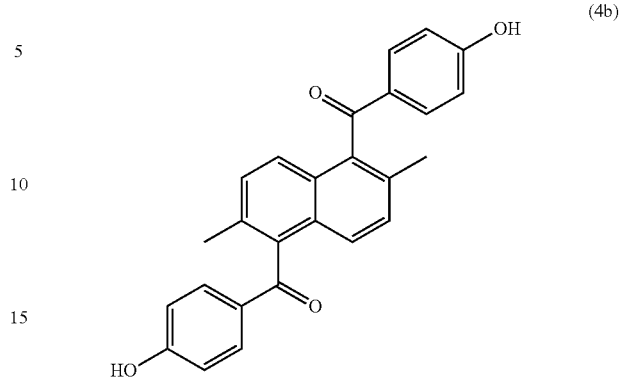

(4b)

The dihydric alcohol 4b (17.6 g, 44.4 mmol), N,N-dimethylformamide (100 mL), 2-chloroethanol (6.26 mL, 93.3 mmol), and cesium carbonate (43.4 g, 133 mmol) were allowed to react in a 500-mL recovery flask at 100° C. for 14.5 hours. After ethyl acetate was added to the product, an oil layer was extracted and was dried over anhydrous magnesium sulfate. The solvent was then removed under reduced pressure. The product was subjected to separation and purification by silica gel column chromatography using a mixed solvent of chloroform and ethyl acetate (the mixing ratio was chloroform:ethyl acetate=1.5:2 to 0:1) as a developing solvent. The solvent was removed by vacuum drying to yield a dihydric alcohol 4a (6.59 g, yield 30%).

Synthesis of Polycarbonate of 4a (Polymer 1)

The dihydric alcohol 4a (3.56 g, 7.32 mmol), diphenyl carbonate (1.57 g, 7.32 mmol), 4-dimethylaminopyridine (0.87 mg, 7.6 μmol), di-tert-butyltin dilaurate (0.086 mL, 0.15 mmol), and triphenyl phosphite (0.077 mL, 0.29 mmol) as an antioxidant were stirred at 180° C. for 30 minutes in a 100-mL Schlenk reactor in an argon atmosphere. With a stepwise reduction in the pressure of the reaction vessel, the reaction temperature was increased stepwise (agitation at 400 hPa at 200° C. for 20 minutes was followed by agitation at 160 hPa at 220° C. for 20 minutes, at 40 hPa at 230° C. for 20 minutes, and at 1 hPa at 250° C. for 30 minutes).

After cooled to room temperature, the resulting solid was dissolved in N,N-dimethylformamide (10 mL). The solution was added to methanol (60 mL) while stirring for reprecipitation. The resulting precipitate was dried under reduced pressure to yield a polymer 1 (2.93 g, yield 78%).

Synthesis of Polycarbonate (Polymer 2) Having Copolymerization Ratio of 4a:7a=25:75

[Chem. 13]

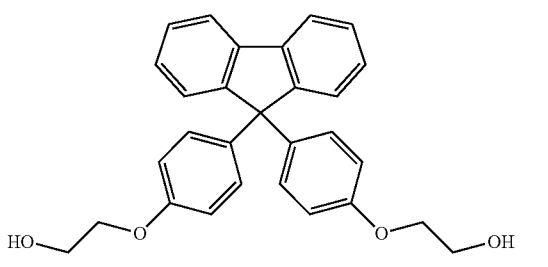

(7a)

The dihydric alcohol 4a (7.3 g, 15.0 mmol), a dihydric alcohol 7a (19.7 g, 45.0 mmol), diphenyl carbonate (12.8 g, 60.0 mmol), di-tert-butyltin dilaurate (0.709 mL, 1.20 mmol), and triphenyl phosphite (0.631 mL, 2.40 mmol) as an antioxidant were stirred at 180° C. for 1.5 hours in a 100-mL Schlenk reactor in an argon atmosphere. With a stepwise reduction in the pressure of the reaction vessel, the reaction temperature was increased stepwise (agitation at 400 hPa at 200° C. for 20 minutes was followed by agitation at 160 hPa at 220° C. for 20 minutes, at 40 hPa at 230° C. for 20 minutes, and at 1 hPa at 250° C. for one hour).

After cooled to room temperature, the resulting solid was dissolved in N,N-dimethylformamide (70 mL). The solution was added to methanol (450 mL) while stirring for reprecipitation. The resulting precipitate was dried under reduced pressure to yield a polymer 2.

Synthesis of Polycarbonate (Polymer 3) Having Copolymerization Ratio of 4a:7a=10:90

The dihydric alcohol 4a (2.9 g, 6.0 mmol), the dihydric alcohol 7a (23.7 g, 54.0 mmol), diphenyl carbonate (12.8 g, 60.0 mmol), di-tert-butyltin dilaurate (0.709 mL, 1.20 mmol), and triphenyl phosphite (0.631 mL, 2.40 mmol) as an antioxidant were stirred at 180° C. for 1.5 hours in a 100-mL Schlenk reactor in an argon atmosphere. With a stepwise reduction in the pressure of the reaction vessel, the reaction temperature was increased stepwise (agitation at 400 hPa at 200° C. for 20 minutes was followed by agitation at 160 hPa at 220° C. for 20 minutes, at 40 hPa at 230° C. for 20 minutes, and at 1 hPa at 250° C. for 1 hour).

After cooled to room temperature, the resulting solid was dissolved in N,N-dimethylformamide (70 mL). The solution was added to methanol (450 mL) while stirring for reprecipitation. The resulting precipitate was dried under reduced pressure to yield a polymer 3.

Synthesis of Polycarbonate of 7a (Polymer 4)

The dihydric alcohol 7a (1.00 g, 2.28 mmol), diphenyl carbonate (489 mg, 2.28 mmol), 4-dimethylaminopyridine (2.8 mg, 22.8 μmol), and triphenyl phosphite (2.28 μL, 8.7 μmol) as an antioxidant were charged into a 20-mL Schlenk reactor in an argon atmosphere. A polymerization reaction and posttreatment under the same conditions as in the synthesis of the polymer 1 yielded a polymer 4 (932 mg, yield 88%).

Analysis and Evaluation of Polymers

Methods for analysis and evaluation of the polymers thus prepared will be described below. The analysis and evaluation items include a molecular weight distribution and a glass transition point. Methods for measuring these items will be described in detail below.

The polymers 1 to 4 were subjected to gel permeation chromatography (GPC) using a chloroform eluent (0.085 mL/min). The analyzer was a high-performance liquid chromatograph (Gulliver [product name] manufactured by JASCO Corp.) having two polystyrene gel columns (TSKgel G5000HXL [product name] and G4000HXL [product name] manufactured by Tosoh Corp.). The retention time of a polymer in the flow path was compared with the retention time of a standard polystyrene having a known molecular weight to approximately determine the number-average molecular weight (Mn) and the weight-average molecular weight (Mw).

The glass transition points (Tg) of the polymers 1 to 4 were measured with a differential scanning calorimeter (DSC: DSC-60 [product name] manufactured by Shimadzu Corp.) at a temperature in the range of normal temperature to 300° C.

Table 1 shows the results.

TABLE 1

| Polymer | First monomer | Percentage | Second monomer | Percentage | Mn | Mw/Mn | Tg (° C.) |
|---|---|---|---|---|---|---|---|
| 1 | 4a | 100% | None | | 14700 | 2.0 | 148 |
| 2 | 4a | 25% | 7a | 75% | 2500 | 2.1 | 148 |
| 3 | 4a | 10% | 7a | 90% | 3500 | 2.4 | 129 |
| 4 | 7a | 100% | None | | 6400 | 3.7 | 150 |

The synthesis examples of an organic-inorganic composite according to the present invention will be described below.

Example 1-1

Composite 1 Containing 1% by Volume Zirconium Oxide and Polymer 1

The polymer 1 (0.500 g) was dissolved in chloroform (4.50 g). 0.234 g of a zirconium oxide/toluene dispersion liquid (10% by weight zirconium oxide, manufactured by Sumitomo Osaka Cement Co., Ltd.) was added to the solution while stirring to prepare a mixed solution. The mixed solution was diluted by a factor of 1000. Observation with a particle size analyzer (Zetasizer Nano-ZS [product name], manufactured by Malvern Instruments Ltd.) showed that zirconium oxide particles were dispersed at a size distribution in the range of 3 to 40 nm.

After the solvent of the mixed solution was removed at 130° C., the mixed solution was dried at 150° C. for one hour at a reduced pressure of 5 hPa or less to yield an organic-inorganic composite 1 containing 1% by volume zirconium oxide. The conversion from the weight percentage to the volume percentage of zirconium oxide was based on the specific gravity of the polymer of 1.20 and the specific gravity of zirconium oxide of 5.56.

Example 1-2

Composite 2 Containing 5% by Volume Zirconium Oxide and Polymer 1

An organic-inorganic composite 2 containing 5% by volume zirconium oxide was prepared in the same manner as in Example 1-1 except that the amount of zirconium oxide/toluene dispersion liquid was altered to 1.22 g.

Example 1-3

Composite 3 Containing 10% by Volume Zirconium Oxide and Polymer 1

An organic-inorganic composite 3 containing 10% by volume zirconium oxide was prepared in the same manner as in Example 1-1 except that the amount of zirconium oxide/toluene dispersion liquid was altered to 2.57 g.

Example 1-4

Composite 4 Containing 15% by Volume Zirconium Oxide and Polymer 1

An organic-inorganic composite 4 containing 15% by volume zirconium oxide was prepared in the same manner as in Example 1-1 except that the amount of zirconium oxide/toluene dispersion liquid was altered to 4.09 g.

Example 2-1

Composite 5 Containing 5% by Volume Titanium Oxide and Polymer 1

0.607 g of titanium tetrabutoxide was added as a fine particle precursor to the polymer 1 (0.800 g) dissolved in chloroform (4.00 g) while stirring to prepare a mixed solution. The solution was stirred at normal temperature to perform the in-situ synthesis of titanium oxide fine particles by hydrolysis with water and hydrochloric acid dissolved in the system. The reaction was completed in 12 hours. The mixed solution was diluted by a factor of 1000. Observation with a particle size analyzer (Zetasizer Nano-ZS [product name], manufactured by Malvern Instruments Ltd.) showed that titanium oxide particles were dispersed at a size distribution in the range of 2 to 20 nm.

After the solvent of the mixed solution was removed at 130° C., the mixed solution was dried at 150° C. for one hour at a reduced pressure of 5 hPa or less to yield an organic-inorganic composite 5 containing 5% by volume titanium oxide. The conversion from the weight percentage to the volume percentage of titanium oxide was based on the specific gravity of the polymer of 1.20 and the specific gravity of titanium oxide of 4.00.

Example 2-2

Composite 6 Containing 5% by Volume Titanium Oxide and Polymer 2

An organic-inorganic composite 6 containing 5% by volume titanium oxide was prepared in the same manner as in Example 2-1 except that the polymer 2 was used.

Example 2-3

Composite 7 Containing 5% by Volume Titanium Oxide and Polymer 3

An organic-inorganic composite 7 containing 5% by volume titanium oxide was prepared in the same manner as in Example 2-1 except that the polymer 3 was used.

Example 3

Composite 8 Containing 5% by Volume Zirconium Oxide, 5% by Volume Titanium Oxide, and Polymer 1

0.607 g of titanium tetrabutoxide was added as a fine particle precursor to the polymer 1 (0.800 g) dissolved in chloroform (4.00 g) while stirring to prepare a mixed solution. The solution was stirred at normal temperature to perform the in-situ synthesis of titanium oxide fine particles by hydrolysis with water and hydrochloric acid dissolved in the system. The reaction was completed in 12 hours. The mixed solution was diluted by a factor of 1000. Observation with a particle size analyzer (Zetasizer Nano-ZS [product name], manufactured by Malvern Instruments Ltd.) showed that titanium oxide particles were dispersed at a size distribution in the range of 2 to 20 nm.

Before the dilution, 1.95 g of a zirconium oxide/toluene dispersion liquid (10% by weight zirconium oxide, manufactured by Sumitomo Osaka Cement Co., Ltd.) was added to the solution while stirring to prepare a mixed solution.

After the solvent of the mixed solution was removed at 130° C., the mixed solution was dried at 150° C. for one hour at a reduced pressure of 5 hPa or less to yield an organic-inorganic composite 8 containing 5% by volume zirconium oxide and 5% by volume titanium oxide. The conversion from the weight percentage to the volume percentage of titanium oxide was based on the specific gravity of the polymer of 1.20, the specific gravity of zirconium oxide of 5.56, and the specific gravity of titanium oxide of 4.00.

Comparative Example 1

Composite 9 Composed Only of Polymer 1

The polymer 1 was directly used as a composite 9 without any processing.

Comparative Example 2

Composite 10 Composed Only of Polymer 2

The polymer 2 was directly used as a composite 10 without any processing.

Comparative Example 3

Composite 11 Composed Only of Polymer 3

The polymer 3 was directly used as a composite 11 without any processing.

Comparative Example 4

Composite 12 Composed Only of Polymer 4

The polymer 4 was directly used as a composite 12 without any processing.

Comparative Example 5

Composite 13 Containing 1% by Volume Zirconium Oxide and Polymer 4

An organic-inorganic composite 13 containing 1% by volume zirconium oxide was prepared in the same manner as in Example 1-1 except that the polymer 4 was used.

Example 4

Preparation Example of Discoid Molded Product for Use in Optical Element

Each of the composites 1 to 13 (0.300 g) was ground in a agate mortar and was charged into a cylindrical metal mold having an inner diameter of 15 mm. Both ends of the metal mold were closed with a cylindrical metal mold having a mirror-finished plane and having a diameter of 15 mm. After a polymer in the mold was melted at 180° C. for 10 minutes, a pressure of 10 MPa was applied to each end of the mold. After cooling to 100° C. and relieving the pressure, a transparent discoid molded product was obtained.

Comparative Example 6

Composite 14 Containing 20% by Volume Zirconium Oxide and Polymer 1

An organic-inorganic composite 14 containing 20% by volume zirconium oxide was prepared in the same manner as in Example 1-1 except that the amount of zirconium oxide/toluene dispersion liquid was altered to 5.79 g. However, the composite 14 had poor melt flowability during heating, and a molded product could not be prepared in the same manner as in Example 4.

Analysis and Evaluation of Organic-Inorganic Composites

Methods for analysis and evaluation of the organic-inorganic composites thus prepared will be described below. The analysis and evaluation item is a refractive index. A method for measuring the refractive index will be described in detail below.

Each of the composites 1 to 13 was dissolved in chloroform. The solution was dropped on a glass substrate and was heated to 150° C. for 30 minutes to remove the solvent, forming a film having an average thickness of 0.7 mm. The refractive index (nd) for a d spectral line (wavelength 587.6 nm) was measured at 27° C. with a Kalnew refractometer (KPR-30 [product name] manufactured by Shimadzu Device Corp.). The Abbe number (vd) of the polymer was calculated from the nd and a difference between a refractive index for an F spectral line (wavelength 486.1 nm) and a refractive index for a C spectral line (656.3 nm).

Table 2 shows the results.

TABLE 2

| | Composite | Polymer | Inorganic oxide fine particles | Concentration (vol %) | nd | vd |
|---|---|---|---|---|---|---|
| Example 1-1 | 1 | 1 | Zirconium oxide | 1 | 1.643 | 18.99 |
| Example 1-2 | 2 | 1 | Zirconium oxide | 5 | 1.670 | 19.34 |
| Example 1-3 | 3 | 1 | Zirconium oxide | 10 | 1.713 | 21.39 |
| Example 1-4 | 4 | 1 | Zirconium oxide | 15 | 1.728 | 22.73 |
| Example 2-1 | 5 | 1 | Titanium oxide | 5 | 1.694 | 15.98 |
| Example 2-2 | 6 | 2 | Titanium oxide | 5 | 1.707 | 18.21 |
| Example 2-3 | 7 | 3 | Titanium oxide | 5 | 1.693 | 19.70 |
| Example 3 | 8 | 1 | Zirconium oxide + Titanium oxide | 5 + 5 | 1.720 | 16.23 |
| Comparative example 1 | 9 | 1 | None | — | 1.633 | 18.95 |
| Comparative example 2 | 10 | 2 | None | — | 1.657 | 21.20 |
| Comparative example 3 | 11 | 3 | None | — | 1.638 | 22.68 |
| Comparative example 4 | 12 | 4 | None | — | 1.639 | 22.89 |
| Comparative example 5 | 13 | 4 | Zirconium oxide | 1 | 1.649 | 23.01 |

Simulation of Optical Properties of Organic-Inorganic Composite

The polarization characteristics of the inside of a fine particle exhibit bulk characteristics. However, if fine particles have a size in the range of 1 to 50 nm, nonuniformity in polarization characteristics for light in a visible wavelength region having a wavelength in the range of 400 to 700 nm is negligible in an ideal composite in which fine particles are uniformly dispersed. The refractive index n of the composite is expressed by the equation (1) based on the Drude theory.

$$n2 = 1 + T(\chi 1) + (1 - T)(\chi 2) \quad (1)$$
$$= 1 + T(n12 - 1) + (1 - T)(n22 - 1)$$

$\chi 1$: Polarization of metal oxide fine particles
$\chi 2$: Polarization of base material (a polymer in the present invention)
T: Volume fraction of fine particles ($0 \leq T \leq 1.0$)
n1: Refractive index of metal oxide
n2: Refractive index of base material (a polymer in the present invention)

The refractive indexes of metal oxides (values for crystals in Handbook of Optics, Vol. 2, 2nd edition, McGraw-Hill, 1994 were used) and the refractive index of the polymer 1 for the d spectral line (wavelength 587.6 nm), the F spectral line (wavelength 486.1 nm), and the C spectral line (wavelength 656.3 nm) were substituted in the equation (1) to calculate the refractive indexes and the Abbe numbers of organic-inorganic composites containing various metal oxide fine particles. FIG. 1 is a graph showing the simulated optical properties. The optical properties of an organic-inorganic composite composed only of the polymer are plotted as a starting point (nd=1.633, vd=18.95). Away from the starting point, the optical properties of organic-inorganic composites containing 5% by volume, 10% by volume, and 15% by volume metal oxide fine particles are plotted.

FIG. 1 shows that, as the fine particle content increases from 5% by volume to 10% by volume and to 15% by volume from a starting point of the polymer alone (nd=1.633, vd=18.95), the optical properties change radially depending on the type of fine particles. FIG. 1 also shows that this simulation is in good agreement with the results in Examples 1-1 to 1-4 and Example 2-1 and reproduces the actual system.

FIG. 1 shows that a polymer for use in the present invention has a high refractive index and a low Abbe number, and therefore even when fine particles of metal oxide other than zirconium oxide or titanium oxide are added to the polymer, the resulting composite can have a high refractive index of 1.60 or more and a low Abbe number of 24 or less. Thus, metal oxide fine particles for use in the present invention are not limited to zirconium oxide or titanium oxide fine particles.

As is apparent from the results in Table 2, the composites containing zirconium oxide according to embodiments of the present invention (Examples 1-1 to 1-4 and Example 3) have a higher refractive index than the corresponding composite composed only of a polymer (Comparative Example 1) while having a low Abbe number. The composites containing titanium oxide according to embodiments of the present invention (Examples 2-1 to 2-3 and Example 3) have a higher refractive index and a lower Abbe number than the corresponding composites composed only of a polymer (Comparative Examples 1 to 3). These results show that the addition of metal oxide fine particles can alter the optical properties of the composite over the range of concentrations at which the metal oxide fine particles can be added.

With the same concentration of fine particles, use of the polymer 1 of a novel dihydric alcohol according to the present invention (Example 1-1) results in a higher refractive index and a lower Abbe number than use of the polymer 4 of a known dihydric alcohol component (Comparative Example 5), indicating that the optical properties of a polymer component are strongly reflected in the composite.

The composites according to embodiments of the present invention (Examples 1-1 to 1-4, Examples 2-1 to 2-3, and Example 3) have a higher refractive index and a lower Abbe number than the composite 12 containing a polymer of a known dihydric alcohol (Comparative Example 4). The addition of a small number of fine particles facilitates the melt processing and molding, as shown in Example 4. Furthermore, the number of fine particles to be added can be altered between 1% by volume or more and 15% by volume or less so as to control the optical properties of the composite. This proves that an organic-inorganic composite according to the present invention is useful as a raw material for optical elements.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-204366, filed Sep. 13, 2010, which is hereby incorporated by reference herein in its entirety.

The invention claimed is:

1. An organic-inorganic composite, comprising: a polymer having a repeating unit represented by the general formula (1); and metal oxide particles

[Chem. 1]

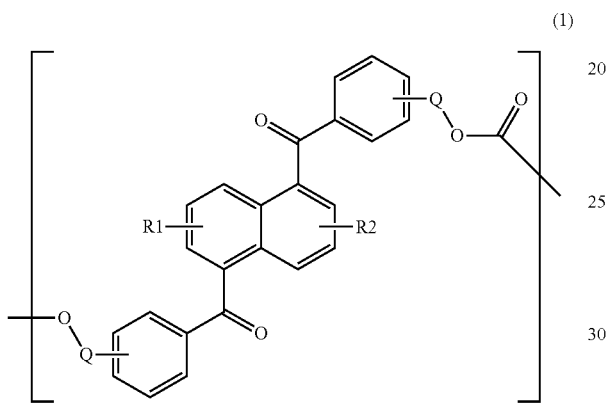

(wherein R1 and R2 independently denote a hydrogen atom or an alkyl group having 1 or more and 6 or less carbon atoms, and Q denotes an oxyethylene group, a thioethylene group, or a single bond).

2. The organic-inorganic composite according to claim 1, wherein the concentration of the metal oxide particles is 1 percent by volume or more and 15 percent by volume or less of the composite.

3. The organic-inorganic composite according to claim 1, wherein the metal oxide particles are made of titanium oxide or zirconium oxide.

4. The organic-inorganic composite according to claim 1, wherein the repeating unit of the polymer includes at least one repeating unit having the general formula (2)

[Chem. 2]

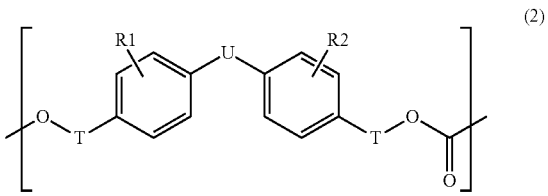

(wherein T denotes an oxyalkylene group having 2 or more and 12 or less carbon atoms, a polyoxyethylene group having 2 or more and 12 or less carbon atoms, or a single bond, R3 and R4 independently denote a hydrogen atom, an alkyl group having 1 or more and 6 or less carbon atoms, an alkoxy group having 1 or more and 6 or less carbon atoms, or an aryl group having 6 or more and 12 or less carbon atoms, and may be the same of different, and U denotes an alkylene group having 1 or more and 13 or less carbon atoms, an alkylidene group having 2 or more and 13 or less carbon atoms, a cycloalkylene group having 5 or more and 13 or less carbon atoms, a cycloalkylidene group having 5 or more and 13 or less carbon atoms, an arylene group having 6 or more and 13 or less carbon atoms, fluorenylidene, —O—, —S—, —SO2—, —CO—, or a single bond, and R3, R4, T, and U in one structural unit may be different from R3, R4, T, and U in another structural unit).

5. The organic-inorganic composite according to claim 1, wherein the organic-inorganic composite has a refractive index (nd) of 1.643 or more and 1.720 or less and an Abbe number (vd) of 15.98 or more and 22.73 or less.

6. A molded product manufactured by shaping an organic-inorganic composite according to claim 1.

7. An optical element manufactured by shaping an organic-inorganic composite according to claim 1.

8. The organic-inorganic composite according to claim 1, wherein the metal oxide particles have an average primary particle size of 1 nm or more and 50 nm or less.

* * * * *